United States Patent
Qi et al.

(10) Patent No.: US 10,613,357 B2
(45) Date of Patent: Apr. 7, 2020

(54) OPTICAL MODULATOR DRIVERS

(71) Applicant: Hewlett Packard Enterprise Development LP, Houston, TX (US)

(72) Inventors: Nan Qi, Palo Alto, CA (US); Cheng Li, Palo Alto, CA (US); Marco Fiorentino, Mountain View, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 52 days.

(21) Appl. No.: 15/768,901

(22) PCT Filed: Oct. 28, 2015

(86) PCT No.: PCT/US2015/057870
§ 371 (c)(1),
(2) Date: Apr. 17, 2018

(87) PCT Pub. No.: WO2017/074366
PCT Pub. Date: May 4, 2017

(65) Prior Publication Data
US 2018/0314080 A1    Nov. 1, 2018

(51) Int. Cl.
*G02F 1/01*    (2006.01)
*H04B 10/588*    (2013.01)
(Continued)

(52) U.S. Cl.
CPC .......... *G02F 1/0121* (2013.01); *G02F 1/0327* (2013.01); *G02F 1/21* (2013.01);
(Continued)

(58) Field of Classification Search
CPC .......... G02F 1/0121; G02F 1/225; G02F 1/21; G02F 1/0327; G02F 2001/212; G02F 2201/126
See application file for complete search history.

(56) References Cited

U.S. PATENT DOCUMENTS

| 7,768,322 B2 | 8/2010 | Sanduleanu et al. |
| 9,020,306 B2 | 4/2015 | Muller et al. |

(Continued)

FOREIGN PATENT DOCUMENTS

KR    1020110128309    11/2011

OTHER PUBLICATIONS

Akiyama, S. et al., "High-speed and Efficient Silicon Modulator Based on Forward-biased Pin Diodes," (Research Paper), Nov. 2014, 7 pages.

*Primary Examiner* — Joseph P Martinez
(74) *Attorney, Agent, or Firm* — Hewlett Packard Enterprise Patent Department

(57) ABSTRACT

One example of a system includes an optical modulator, a push-pull driver, and a compensation circuit. The optical modulator has a nonlinear capacitance. The push-pull driver is electrically coupled across the optical modulator. The push-pull driver charges the capacitance in response to a logic '1' of a level-shifted differential signal and discharges the capacitance in response to a logic '0' of the level-shifted differential signal. The compensation circuit increases the speed of the discharge of the capacitance in response to the level-shifted differential signal transitioning from a logic '1' to a logic '0'.

17 Claims, 5 Drawing Sheets

(51) Int. Cl.
*G02F 1/03* (2006.01)
*G02F 1/225* (2006.01)
*G02F 1/21* (2006.01)

(52) U.S. Cl.
CPC .......... *G02F 1/225* (2013.01); *H04B 10/588* (2013.01); *G02F 2001/212* (2013.01); *G02F 2201/126* (2013.01)

(56) References Cited

U.S. PATENT DOCUMENTS

| | | |
|---|---|---|
| 9,069,223 B2 | 6/2015 | Prosyk |
| 2003/0234969 A1 | 12/2003 | Bostak |
| 2004/0223768 A1* | 11/2004 | Shastri ................ G02F 1/0121 398/183 |
| 2013/0308893 A1* | 11/2013 | Zuffada ................ H03F 1/223 385/3 |
| 2014/0104666 A1 | 4/2014 | Minoia et al. |
| 2015/0070709 A1 | 3/2015 | Porte et al. |

* cited by examiner

OPTICAL MODULATOR DRIVERS

STATEMENT OF UNITED STATES GOVERNMENT INTEREST

This invention was made with United States government support under Contract No. H98230-14-3-0011. The United States government has certain rights in the invention.

BACKGROUND

Data center networks may use fiber optics to communicate data between devices, such as servers and switches. An optical transmitter is used to convert an electrical signal to an optical signal for transmission through a fiber optic cable. An optical receiver is used to convert a received optical signal back into an electrical signal.

DETAILED DESCRIPTION

Figure 1:
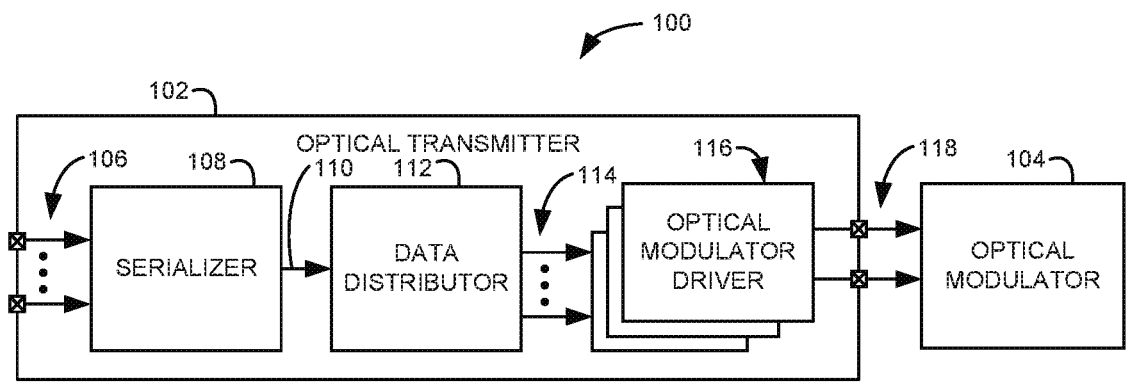
FIG. 1 is a block diagram illustrating one example of a system.

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

An optical modulator driver may include a push-pull topology including two stacked inverters. One inverter works in the common to supply voltage (e.g., 0 to VDD) power domain and the other inverter works in the supply voltage to two times the supply voltage (e.g., VDD to 2×VDD) power domain. The optical modulator driver enables an output swing equivalent to two times the supply voltage. The optical modulator driver is designed to have a symmetric driving capability for all the rising and falling transitions. Due to nonlinear diode capacitance of an optical modulator, however, the cathode terminal's falling transition and the anode terminal's rising transition are much slower than the other transitions under symmetric driving, which leads to eye-diagram distortion of the output voltages. The size of the optical modulator driver may be designed to be sufficiently powerful for the maximum capacitance under all driving voltage conditions. This, however, results in wasting power for the transitions that are already fast enough and the transitions corresponding to the maximum loading capacitance are still slower than the transitions with the minimum loading capacitance. Thus, the eye-diagram distortion of the output voltages may be reduced but not eliminated.

A segmented Mach Zehnder modulator (MZM) includes multiple high-speed modulators realized in P/N junction diodes whose capacitance varies with the instantaneous voltage difference applied across their two terminals. For a typical MZM design, the effective capacitance under maximum and minimum voltage difference applied may vary 1.5 to 2 times. The optical modulator driver driving voltage's transition speed is determined by the maximum deliverable current and the total loading capacitance at the output terminals. On the other hand, the MZM cathode terminal's falling transition and the anode terminal's rising transition happens exactly when the maximum loading capacitance is presented to the driver, and thus leads to much slower transitions and distortion. This distortion may lead to intersymbol interference (ISI), degradation of noise margin, and receiver side added jitter in the recovered data.

Accordingly, the following description describes examples of an optical modulator driver including a pulse-controlled asymmetric transition compensation circuit, which provides a fast discharge path between the MZM diode's anode and cathode terminals, which lasts during the slow transition period. The pulse-controlled compensation may selectively boost the slow transitions' speed and leave the fast transitions unchanged. Therefore, eye-diagram distortion induced by asymmetric transitions can be removed. The additional fast discharge path may conduct current during the specific transition time, which saves power consumption and improves the efficiency. The pre-emphasis emphasizes the high frequency output current during certain transitions, instead of attenuating low-frequency components as in traditional feed-forward equalizations. Therefore, the output swing is not scaled down, which is especially useful for high swing applications in MZM. In addition, the pulse width and pre-emphasis strength may be made tunable to overcome process variations, MZM modeling uncertainties, and performance/power consumption tradeoffs.

FIG. 1 is a block diagram illustrating one example of a system 100. System 100 includes an optical transmitter 102 and an optical modulator 104. Optical transmitter 102 includes a serializer 108, a data distributor 112, and a plurality of optical modulator drivers 116. Serializer 108 receives parallel data through a plurality of signal paths 106. Serializer 108 serializes the received parallel data to provide serial data on signal path 110. Data distributor 112 receives the serial data on signal path 110 and distributes the serial data to the plurality of optical modulator drivers 116 through a plurality of signal paths 114, respectively. Each optical modulator driver of the plurality of optical modulator drivers 116 receives a differential data signal to drive an optical modulator, such as optical modulator 104, by providing an output signal through a signal path, such as signal path 118. Optical modulator 104 may be a MZM, a micro-ring modulator, or another suitable depletion mode optical modulation device having a nonlinear capacitance.

Figure 2:
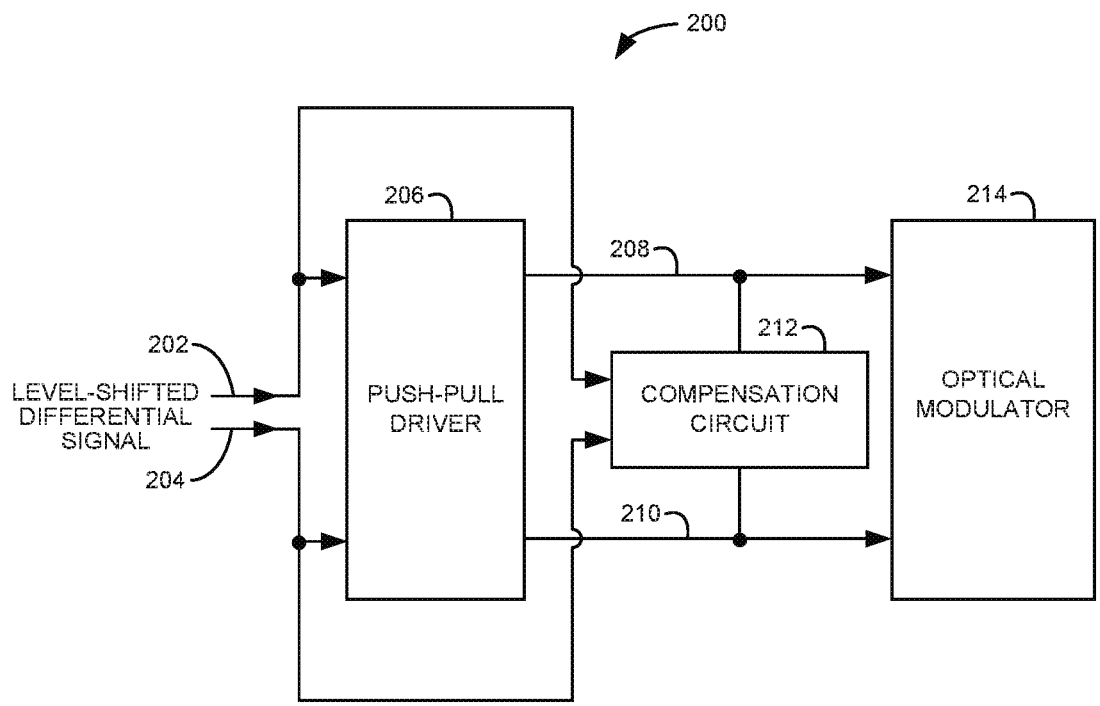
FIG. 2 is a block diagram illustrating one example of an optical modulator driver.

FIG. 2 is a block diagram illustrating one example of an optical modulator driver 200 to drive optical modulator 214. In one example, optical modulator driver 200 provides an optical modulator driver 116 previously described and illustrated with reference to FIG. 1. Optical modulator driver 200 includes a push-pull driver 206 and a compensation circuit 212. The input to push-pull driver 206 and the input to compensation circuit 212 receive a level-shifted differential signal through signal paths 202 and 204. The output of push-pull driver 206 is electrically coupled across optical modulator 214 and across compensation circuit 212 through signal paths 208 and 210.

Optical modulator 214 may be a MZM, a micro-ring modulator, or another suitable depletion mode optical modulation device having a nonlinear capacitance. Push-pull driver 206 drives optical modulator 214 based on the level-shifted differential signal. Push-pull driver 206 charges the capacitance of optical modulator 214 in response to a logic '1' of the level-shifted differential signal and discharges the capacitance of optical modulator 214 in response to a logic '0' of the level-shifted differential signal. Compensation circuit 212 increases the speed of the discharge of the capacitance of optical modulator 214 in response to the level-shifted differential signal transitioning from a logic '1' to a logic '0'. Compensation circuit 212 is inactive during the charging of the capacitance of optical modulator 214 in response to the level-shifted differential signal transitioning from a logic '0' to a logic '1'.

Figure 3:
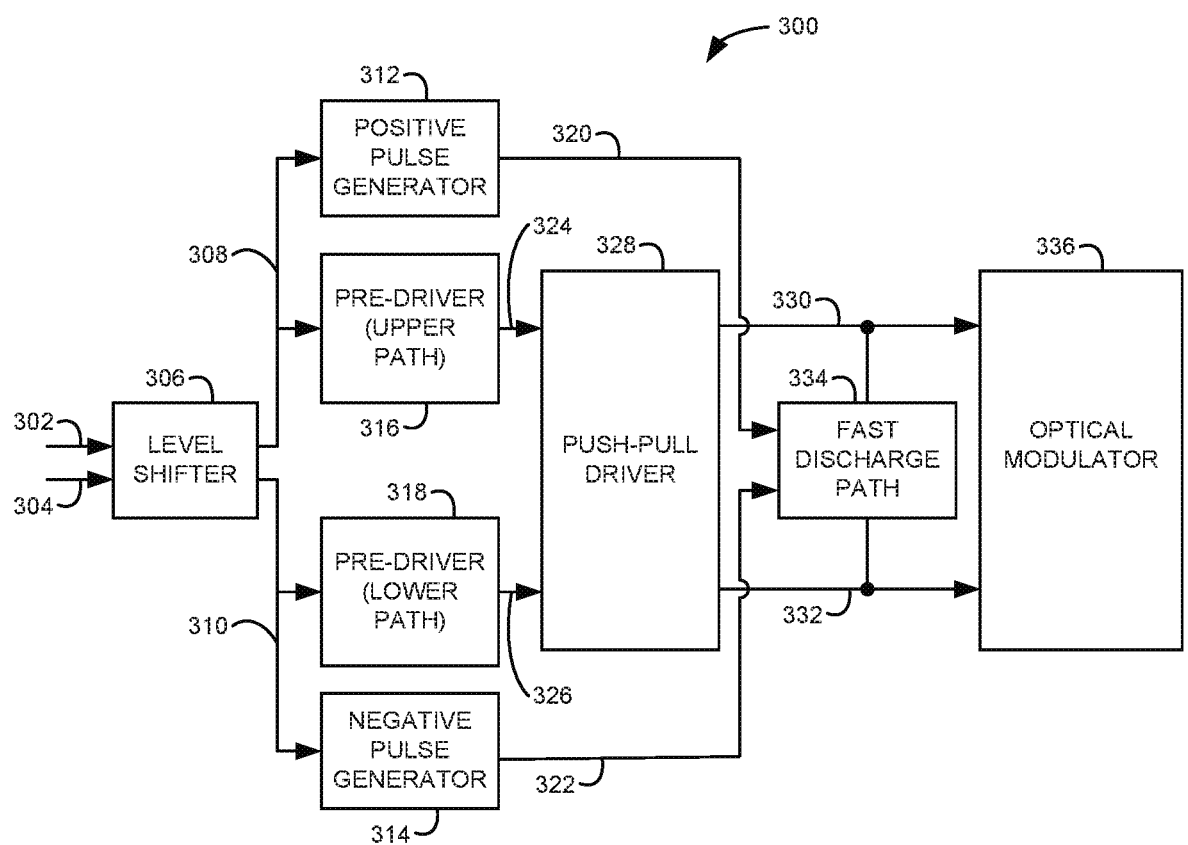
FIG. 3 is a block diagram illustrating another example of an optical modulator driver.

FIG. 3 is a block diagram illustrating another example of an optical modulator driver 300 to drive an optical modulator 336. In one example, optical modulator driver 300 provides optical modulator driver 200 previously described and illustrated with reference to FIG. 2. Optical modulator driver 300 includes a level shifter 306, a positive pulse generator 312, a negative pulse generator 314, a pre-driver (upper path) 316, a pre-driver (lower path) 318, a push-pull driver 328, and a fast discharge path 334. In this example, positive pulse generator 312, negative pulse generator 314, and fast discharge path 334 provide the compensation circuit.

Level shifter 306 receives a differential signal through signal paths 302 and 304 such that the signal on signal path 304 is complementary to the signal on signal path 302. The upper output of level shifter 306 is electrically coupled to the input of positive pulse generator 312 and the input of pre-driver 316 through a signal path 308. The lower output of level shifter 306 is electrically coupled to the input of negative pulse generator 314 and the input of pre-driver 318 through a signal path 310. The output of positive pulse generator 312 is electrically coupled to the upper input of fast discharge path 334 through a signal path 320. The output of negative pulse generator 314 is electrically coupled to the lower input of fast discharge path 334 through a signal path 322. The output of pre-driver 316 is electrically coupled to the upper input of push-pull driver 328 through a signal path 324. The output of pre-driver 318 is electrically coupled to the lower input of push-pull driver 328 through a signal path 326. The output of push-pull driver 328 is electrically coupled across optical modulator 336 and across fast discharge path 334 through signal paths 330 and 332. Optical modulator 336 may be a MZM, a micro-ring modulator, or another suitable depletion mode optical modulation device having a nonlinear capacitance.

Level shifter 306 receives the differential signal on signal paths 302 and 304 to provide a level-shifted differential signal on signal paths 308 and 310, respectively. Positive pulse generator 312 receives a first signal of the level-shifted differential signal on signal path 308 to provide a positive pulse on signal path 320 in response to the level-shifted differential signal transitioning from a logic '1' to a logic '0'. Negative pulse generator 314 receives a second signal of the level-shifted differential signal complementary to the first signal on signal path 310 to provide a negative pulse on signal path 322 in response to the level-shifted differential signal transitioning from a logic '1' to a logic '0', Pre-driver 316 receives the first signal on signal path 308 to pre-drive the first signal to provide the pre-driven first signal on signal path 324. Pre-driver 318 receives the second signal on signal path 310 to pre-drive the second signal to provide the pre-driven second signal on signal path 326. Pre-drivers 316 and 318 may enable a higher driving capability.

Push-pull driver 328 receives the pre-driven first signal on signal path 324 and the pre-driven second signal on signal path 326 to charge the capacitance of optical modulator 336 through signal paths 330 and 332 in response to a logic '1' of the level-shifted differential signal and discharge the capacitance of optical modulator 336 in response to a logic '0' of the level-shifted differential signal. Fast discharge path 334 is activated by the positive pulse on signal path 320 and the negative pulse on signal path 322 to increase the speed of the discharge of the capacitance of optical modulator 336 in response to the level-shifted differential signal transitioning from a logic '1' to a logic '0'.

Figure 4:
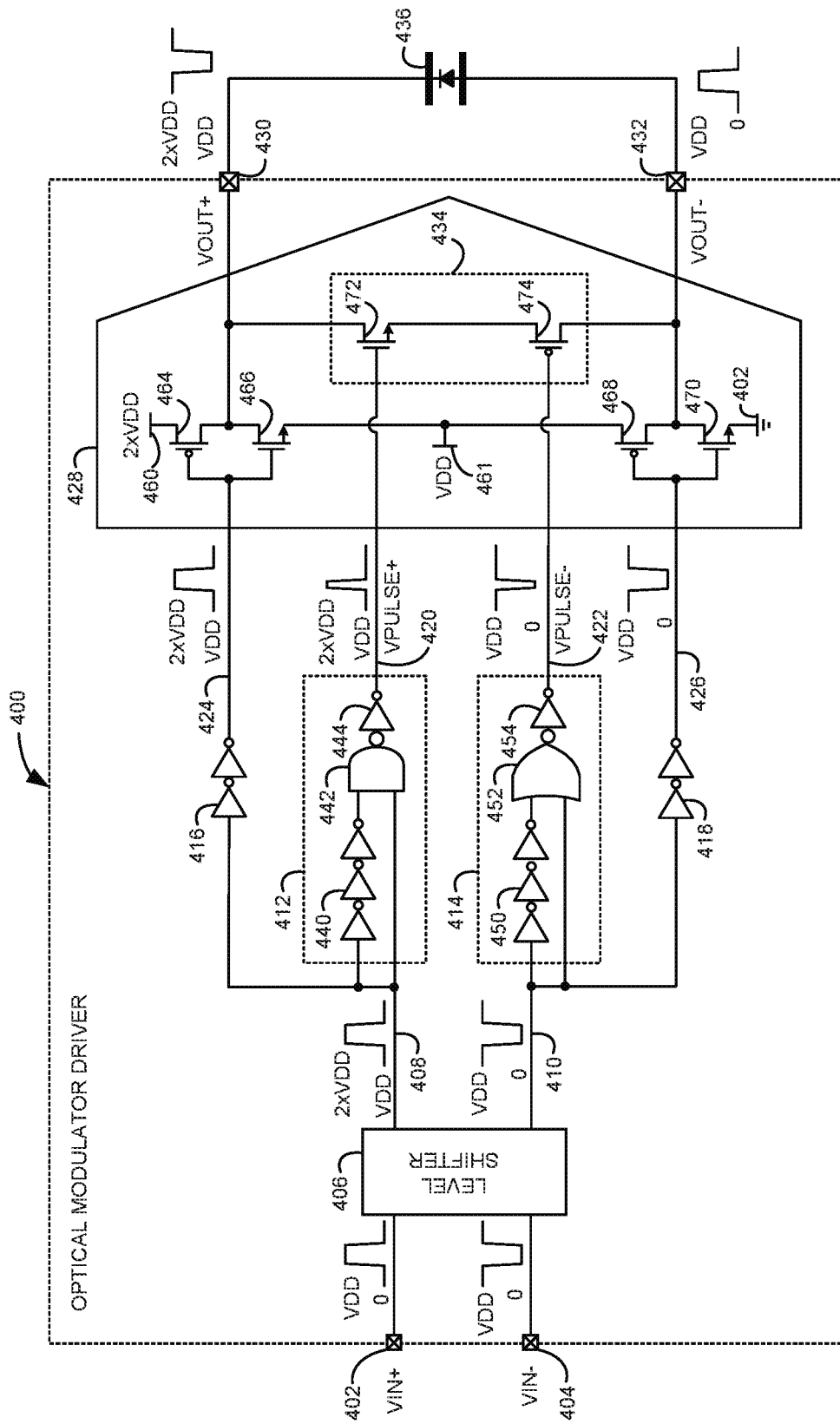
FIG. 4 is a schematic diagram illustrating one example of an optical modulator driver.

FIG. 4 is a schematic diagram illustrating one example of an optical modulator driver 400 to drive an optical modulator 436. In one example, optical modulator driver 400 provides optical modulator driver 300 previously described and illustrated with reference to FIG. 3. Optical modulator driver 400 includes a level shifter 406, a positive pulse generator 412, a negative pulse generator 414, a pre-driver (upper path) 416, a pre-driver (lower path) 418, a push-pull driver 428, and a fast discharge path 434.

Positive pulse generator 412 includes a delay 440, a NAND gate 442, and an inverter 444. Negative pulse generator 414 includes a delay 450, a NOR gate 452, and an inverter 454. Pre-driver 416 and pre-driver 418 may each include an even number of inverters. Push-pull driver 428 includes transistors 464, 466, 468, and 470. In one example, transistors 464 and 468 are p-channel metal-oxide-semiconductor field-effect transistors (MOSFETs) and transistors 466 and 470 are n-channel MOSFETs. Fast discharge path 434 includes transistors 472 and 474. In one example, transistor 472 is an n-channel MOSFET and transistor 474 is a p-channel MOSFET.

The upper input of level shifter 406 is electrically coupled to node 402. The lower input of level shifter 406 is electrically coupled to node 404. The upper output of level shifter 406 is electrically coupled to the input of pre-driver 416 through a signal path 408. The output of pre-driver 416 is electrically coupled to the gates of transistors 464 and 466 through a signal path 424. The upper output of level shifter 406 is also electrically coupled to the input of delay 440 and an input of NAND gate 442 of positive pulse generator 412 through signal path 408. The output of delay 440 is electrically coupled to the other input of NAND gate 442. The output of NAND gate 442 is electrically coupled to the input of inverter 444. The output of inverter 444 is electrically coupled to the gate of transistor 472 through a signal path 420.

The lower output of level shifter 406 is electrically coupled to the input of pre-driver 418 through a signal path 410. The output of pre-driver 418 is electrically coupled to the gates of transistors 468 and 470 through a signal path 426. The lower output of level shifter 406 is also electrically coupled to the input of delay 450 and an input of NOR gate 452 of negative pulse generator 414 through signal path 410. The output of delay 450 is electrically coupled to the other input of NOR gate 452. The output of NOR gate 452 is electrically coupled to the input of inverter 454. The output of inverter 454 is electrically coupled to the gate of transistor 474 through a signal path 422.

The source of transistor 464 is electrically coupled to two times the supply voltage (2×VDD) 460. The drain of transistor 464 is electrically coupled to the drain of transistor 466, the drain of transistor 472, and the cathode of optical modulator 436 through a node 430. The source of transistor 472 is electrically coupled to the source of transistor 474. The source of transistor 466 and the source of transistor 468 are electrically coupled to the supply voltage (VDD) 461. The drain of transistor 468 is electrically coupled to the drain of transistor 470, the drain of transistor 474, and the anode of optical modulator 436 through a node 432. Optical modulator 436 may be a MZM, a micro-ring modulator, or another suitable depletion mode optical modulation device having a nonlinear capacitance.

Level shifter 406 receives a differential signal (VIN+ and VIN−) on nodes 402 and 404, respectively. The VIN+ signal and the VIN− signal are in the common voltage to a supply voltage (0 to VDD) power domain and the VIN− signal is complementary to the VIN+ signal. Level shifter 406 shifts the VIN+ signal to the power supply to two times the power supply (VDD to 2×VDD) power domain to provide a level-shifted VIN+ signal on signal path 408. Level shifter 406 buffers the VIN− signal to keep the VIN− signal on signal path 410 aligned with the level-shifted VIN+ signal on signal path 408. As used herein, a "level-shifted differential signal" refers to the level-shifted VIN+ signal in the VDD to 2×VDD power domain and the VIN− signal in the 0 to VDD power domain, where the VIN− signal is complementary to the level-shifted VIN+ signal (e.g., the signals on signal paths 408 and 410).

Positive pulse generator 412 receives the level-shifted VIN+ signal of the level-shifted differential signal on signal path 408 to provide a positive pulse on signal path 420 to drive the gate of transistor 472 in response to the level-shifted differential signal transitioning from a logic '1' to a logic '0' (i.e., when the level-shifted VIN+ signal on signal path 408 transitions from VDD to 2×VDD). Delay 440 delays and inverts the level-shifted VIN+ signal and NAND gate 442 NANDs the delayed level-shifted VIN+ signal and the non-delayed level-shifted VIN+ signal. Inverter 444 inverts the output of NAND gate 442 Accordingly, a positive pulse (VPULSE+), which transitions between VDD and 2×VDD, is provided on signal path 420 having a pulse width equal to the length of delay 440. In one example, the pulse width is set to be between one fifth and one fourth of one unit interval (UI).

Negative pulse generator 414 receives the VIN− signal of the level-shifted differential signal on signal path 410 to provide a negative pulse on signal path 422 to drive the gate of transistor 474 in response to the level-shifted differential signal transitioning from a logic '1' to a logic '0' (i.e., when the VIN− signal on signal path 410 transitions from VDD to 0). Delay 450 delays and inverts the VIN− signal and NOR gate 452 NORs the delayed VIN− signal and the non-delayed VIN− signal. Inverter 454 inverts the output of NOR gate 452. Accordingly, a negative pulse (VPULSE−), which transitions between VDD and 0, is provided on signal path 422 having a pulse width equal to the length of delay 450. The pulse width of the negative pulse is set equal to the pulse width of the positive pulse. In one example, the pulse width is set to be between one fifth and one fourth of one UI.

Pre-driver 416 receives the level-shifted VIN+ signal on signal path 408 to pre-drive the level-shifted VIN+ signal to drive the gates of transistors 464 and 466. Pre-driver 418 receives the VIN− signal on signal path 410 to pre-drive the VIN− signal to drive the gates of transistors 468 and 470.

Transistors 464 and 466 provide a first inverter of push-pull driver 428 that operates between the supply voltage (VDD) and two times the supply voltage (2×VDD). Transistors 468 and 470 provide a second inverter of push-pull driver 428 that operates between the common or ground and the supply voltage (VDD). The first inverter drives the cathode of optical modulator 436 through node 430 and the second inverter drives the anode of optical modulator 436 through node 432. Push-pull driver 428 charges the capacitance of optical modulator 436 to 2×VDD by a current flowing through transistors 464 and 470 in response to a '1' of the level-shifted differential signal. Push-pull driver 428 discharges the capacitance of optical modulator 436 by a current flowing through transistors 466 and 468 in response to a logic '0' of the level-shifted differential signal.

The slowest transition occurs at the logic '1' to logic '0' transition when the minimum voltage across optical modulator 436 leads to the largest capacitance of optical modulator 436. Fast discharge path 434 compensates for the slowest transition. Transistor 472 is turned on in response to the VPULSE+ signal and transistor 474 is turned on in response to the VPULSE− signal during the transition between logic '1' and logic '0' to increase the speed of the discharge of the capacitance of optical modulator 436.

Figure 5:
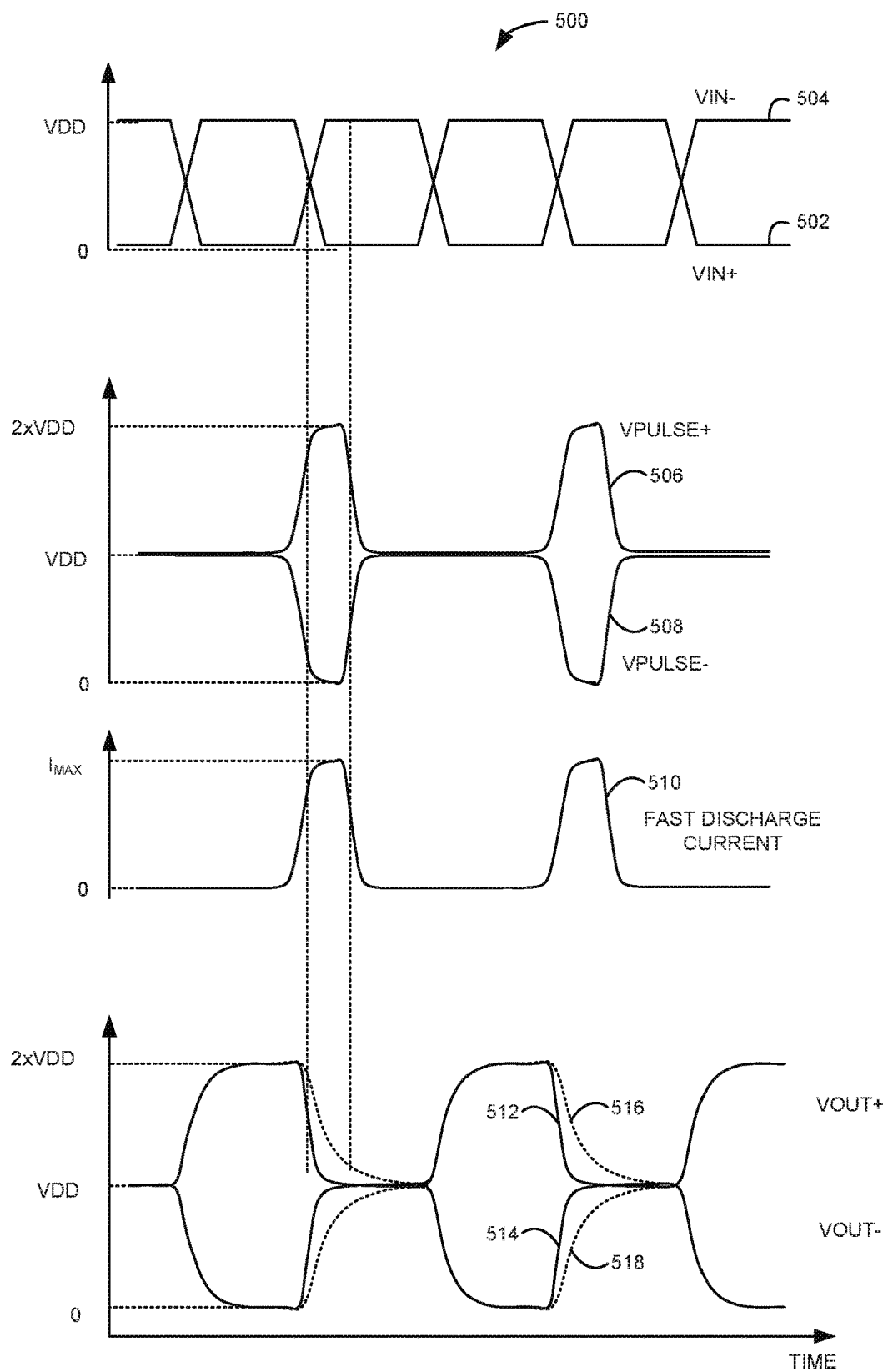
FIG. 5 is a timing diagram illustrating one example of signals for the optical modulator driver illustrated in FIG. 4.

FIG. 5 is a timing diagram 500 illustrating one example of signals for optical modulator driver 400 previously described and illustrated with reference to FIG. 4. Timing diagram 500 includes VIN+ signal 502 on node 402, VIN− signal 504 on node 404, VPULSE+ signal 506 on node 420, VPULSE− signal 508 on node 422, fast discharge current signal 510 through fast discharge path 434, VOUT+ signal 512 on node 430, and VOUT− signal 514 on node 432. Timing diagram 500 also includes VOUT+ signal 516 and VOUT− signal 518 in dashed lines indicating what these signals would look like without the compensation circuit provided by positive pulse generator 412, negative pulse generator 414, and fast discharge path 434.

VIN+ signal 502 and VIN− signal 504 provide a differential signal in the 0 to VDD power domain in which VIN− signal 504 is complementary to VIN+ signal 502. When VIN+ signal 502 is at VDD and VIN− signal 504 is at 0, the differential signal represents a logic '0'. When VIN+ signal 504 is at 0 and VIN− signal 504 is at VDD, the differential signal represents a logic '1'. Level shifter 406 (FIG. 4) shifts VIN+ signal 502 to the VDD to 2×VDD power domain (not shown) and buffers VIN− signal 504 to maintain alignment with the level-shifted VIN+ signal.

In response to a falling edge of VIN+ signal 502, VOUT+ signal 512 transitions from VDD to 2×VDD. At the same time, in response to a rising edge of VIN− signal 504, VOUT− signal 514 transitions from VDD to 0. In response to a rising edge of VIN+ signal 502, VPLUSE+ signal 506 transitions from VDD to 2×VDD and VOUT+ signal 512 transitions from 2×VDD to VDD. At the same time, in response to a falling edge of VIN− signal 504, VPULSE− signal 508 transitions from VDD to 0 and VOUT− signal 514 transitions from 0 to VDD. In response to VPULSE+ signal 506 transitioning to 2×VDD and VPULSE− signal 508 transitioning to 0, fast discharge current signal 510 from node 430 to node 432 through transistors 472 and 474 (FIG. 4) transitions from 0 to a maximum current ($I_{MAX}$) thereby quickly discharging the capacitance of optical modulator 436.

By quickly discharging the capacitance of optical modulator 436, the speed of the transition of VOUT+ signal 512 from 2×VDD to VDD and the transition of VOUT− signal 514 from 0 to VDD is increased compared to what the speed of the transition would be without the compensation circuit as indicated by signals 516 and 518. After the delay of positive pulse generator 412, VPULSE+ signal 506 transitions from 2×VDD to VDD. Likewise, after the delay of negative pulse generator 414, VPULSE− signal 508 transitions from 0 to VDD. Thus, the positive pulse of VPULSE+ signal 506 and the negative pulse of VPULSE− signal 508 last during the transition of VOUT+ signal 512 and VOUT− signal 514 from a logic '1' to a logic '0'.

Figure 6:
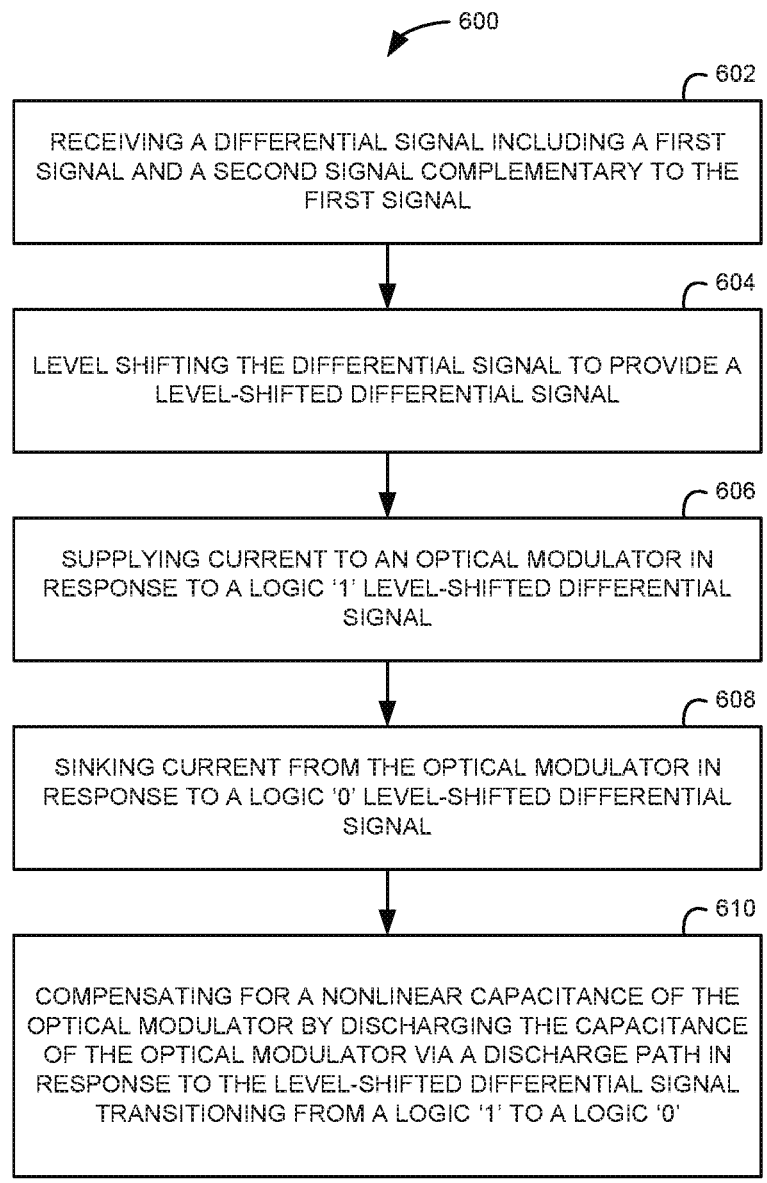
FIG. 6 is a flow diagram illustrating one example of a method for driving an optical modulator.

FIG. 6 is a flow diagram illustrating one example of a method 600 for driving an optical modulator. At 602, method 600 includes receiving a differential signal including a first signal and a second signal complementary to the first signal. At 604, method 600 includes level shifting the differential signal to provide a level-shifted differential signal. At 606, method 600 includes supplying current to an optical modulator in response to a logic '1' level-shifted differential signal. At 608, method 600 includes sinking current from the optical modulator in response to a logic '0' level-shifted differential signal. At 610, method 600 includes compensating for a nonlinear capacitance of the optical modulator by discharging the capacitance of the optical modulator via a discharge path in response to the level-shifted differential signal transitioning from a logic '1' to a logic '0'.

In one example, compensating for the nonlinear capacitance of the optical modulator comprises generating a positive pulse and a negative pulse in response to the level-shifted differential signal transitioning from a logic '1' to a logic '0' and activating the discharge path in response to the positive pulse and the negative pulse. In another example, supplying current to the optical modulator comprises supplying current to the optical modulator via a push-pull driver and sinking current from the optical modulator comprises sinking current from the optical modulator via the push-pull driver. In another example, method 600 also includes pre-driving the level-shifted differential signal.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A system comprising:
an optical modulator having a nonlinear capacitance;
a push-pull driver electrically coupled across the optical modulator, the push-pull driver to charge the capacitance in response to a logic '1' of a level-shifted differential signal and discharge the capacitance in response to a logic '0' of the level-shifted differential signal, wherein the level-shifted differential signal comprises a first signal and a second signal complementary to the first signal, the first signal in a common voltage to a supply voltage power domain, and the second signal in the supply voltage to two times the supply voltage power domain; and
a compensation circuit to increase the speed of the discharge of the capacitance in response to the level-shifted differential signal transitioning from a logic '1' to a logic '0'.

2. The system of claim 1, wherein the compensation circuit comprises:
a positive pulse generator to provide a positive pulse in response to the level-shifted differential signal transitioning from a logic '1' to a logic '0';
a negative pulse generator to provide a negative pulse in response to the level-shifted differential signal transitioning from a logic '1' to a logic '0'; and
a discharge path electrically coupled across the optical modulator, the discharge path activated by the positive pulse and the negative pulse.

3. The system of claim 1, further comprising:
a level shifter to provide the level-shifted differential signal in response to a differential signal.

4. The system of claim 1, wherein the optical modulator comprises a Mach Zehnder modulator or a micro-ring modulator.

5. A system comprising:
an optical modulator having a nonlinear capacitance;
a positive pulse generator to receive a first signal of a level-shifted differential signal to provide a positive pulse in response to the level-shifted differential signal transitioning from a logic '1' to a logic '0';
a negative pulse generator to receive a second signal of the level-shifted differential signal complementary to the first signal to provide a negative pulse in response to the level-shifted differential signal transitioning from a logic '1' to a logic '0';
a push-pull driver electrically coupled across the optical modulator, the push-pull driver to charge the capacitance in response to a logic '1' of the level-shifted differential signal and discharge the capacitance in response to a logic '0' of the level-shifted differential signal; and
a discharge path electrically coupled across the optical modulator, the discharge path activated by the positive pulse and the negative pulse to increase the speed of the discharge of the capacitance.

6. The system of claim 5, further comprising:
a level shifter to provide the first signal and the second signal in response to a differential signal.

7. The system of claim 6, further comprising:
a first pre-driver coupled between the level shifter and the push-pull driver to pre-drive the first signal; and
a second pre-driver coupled between the level shifter and the push-pull driver to pre-drive the second signal.

8. The system of claim 5, wherein the positive pulse has a pulse width less than a unit interval of the level-shifted differential signal, and
wherein the negative pulse has a pulse width less than a unit interval of the level-shifted differential signal, and
wherein the pulse width of the positive pulse equals the pulse width of the negative pulse.

9. The system of claim 5, wherein the optical modulator comprises a Mach Zehnder modulator.

10. The system of claim 5, wherein the optical modulator comprises a micro-ring modulator.

11. A method for controlling an optical modulator, the method comprising:
receiving a differential signal including a first signal and a second signal complementary to the first signal;
level shifting the differential signal to provide a level-shifted differential signal;
supplying current to an optical modulator in response to a logic '1' level-shifted differential signal;
sinking current from the optical modulator in response to a logic '0' level-shifted differential signal; and
compensating for a nonlinear capacitance of the optical modulator by discharging the capacitance of the optical modulator via a discharge path in response to the level-shifted differential signal transitioning from a logic '1' to a logic '0'.

12. The method of claim 11, wherein compensating for the nonlinear capacitance of the optical modulator comprises:
generating a positive pulse and a negative pulse in response to the level-shifted differential signal transitioning from a logic '1' to a logic '0'; and
activating the discharge path in response to the positive pulse and the negative pulse.

13. The method of claim 11, wherein supplying current to the optical modulator comprises supplying current to the optical modulator via a push-pull driver; and
wherein sinking current from the optical modulator comprises sinking current from the optical modulator via the push-pull driver.

14. The method of claim 11, further comprising:
pre-driving the level-shifted differential signal.

15. A system comprising:
an optical modulator having a nonlinear capacitance;
a push-pull driver electrically coupled across the optical modulator, the push-pull driver to charge the capacitance in response to a logic '1' of a level-shifted differential signal and discharge the capacitance in response to a logic '0' of the level-shifted differential signal; and
a compensation circuit to increase the speed of the discharge of the capacitance in response to the level-shifted differential signal transitioning from a logic '1' to a logic '0', wherein the compensation circuit comprises:
a positive pulse generator to provide a positive pulse in response to the level-shifted differential signal transitioning from a logic '1' to a logic '0';
a negative pulse generator to provide a negative pulse in response to the level-shifted differential signal transitioning from a logic '1' to a logic '0'; and
a discharge path electrically coupled across the optical modulator, the discharge path activated by the positive pulse and the negative pulse.

16. The system of claim 15, further comprising:
a level shifter to provide the level-shifted differential signal in response to a differential signal.

17. The system of claim 15, wherein the optical modulator comprises a Mach Zehnder modulator or a micro-ring modulator.

* * * * *